(12) United States Patent
Fan et al.

(10) Patent No.: US 10,160,005 B2
(45) Date of Patent: Dec. 25, 2018

(54) COATED ARTICLES AND METHODS OF MAKING THE SAME

(71) Applicant: GM GLOBAL TECHNOLOGY OPERATIONS LLC, Detroit, MI (US)

(72) Inventors: Hua-tzu Fan, Troy, MI (US); Jorge F. Arinez, Rochester Hills, MI (US); Alejandro Hernan Plazas Torres, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 15/152,311

(22) Filed: May 11, 2016

(65) Prior Publication Data

US 2016/0348248 A1 Dec. 1, 2016

Related U.S. Application Data

(60) Provisional application No. 62/167,855, filed on May 28, 2015.

(51) Int. Cl.
*B05D 1/00* (2006.01)
*C23C 18/12* (2006.01)
*C23C 28/00* (2006.01)

(52) U.S. Cl.
CPC .............. *B05D 1/00* (2013.01); *C23C 18/122* (2013.01); *C23C 18/127* (2013.01); *C23C 18/1212* (2013.01); *C23C 18/1241* (2013.01); *C23C 18/1254* (2013.01); *C23C 28/00* (2013.01)

(58) Field of Classification Search
CPC ....... B05D 1/00; C23C 18/1254; C23C 28/00; C23C 18/1212; C23C 18/122; C23C 18/1241; C23C 18/127
See application file for complete search history.

(56) References Cited

U.S. PATENT DOCUMENTS

| 5,082,536 A | 1/1992 | Izaki et al. |
| 8,831,921 B2 | 9/2014 | Tilove et al. |
| 2006/0167147 A1 | 7/2006 | Asgari |
| 2011/0057340 A1* | 3/2011 | Perichaud .............. C08F 2/00 264/36.22 |
| 2014/0134426 A1 | 5/2014 | Henry |
| 2014/0371362 A1 | 12/2014 | Wilson |
| 2015/0064482 A1 | 3/2015 | Fan et al. |

FOREIGN PATENT DOCUMENTS

| CN | 1286720 A | 3/2001 |
| CN | 106189821 A | 12/2016 |
| DE | 102004010212 A1 | 9/2005 |
| DE | 102008003392 B4 | 11/2016 |
| DE | 102016209157 A1 | 12/2016 |
| EP | 1090165 A2 | 4/2001 |
| JP | 2010150459 A | 7/2010 |
| KR | 20090071162 A | 7/2009 |
| WO | WO-9946338 A1 | 9/1999 |
| WO | WO-9961182 A2 | 12/1999 |

OTHER PUBLICATIONS

First Office Action in German Application No. 102016209157.3 from the German Patent Office dated Oct. 10, 2017 and correspondence from Manitz, Finsterwald & Partner summarizing the First Office Action; 7 pages.
First Office Action in Chinese Application No. 201610353466.9 from the Chinese Patent Office dated Dec. 19, 2017; 8 pages.

* cited by examiner

*Primary Examiner* — Patrick D Niland
(74) *Attorney, Agent, or Firm* — Harness, Dickey & Pierce, P.L.C.

(57) ABSTRACT

During an example coating method, a metallic substrate is provided. A foundation coat precursor is applied on the metallic substrate. The foundation coat precursor includes a matrix and a plurality of capsules present in the matrix. Each capsule includes a shell and a healing agent surrounded by the shell. A basecoat precursor is applied, and a clearcoat precursor is applied. The metallic substrate, the foundation coat precursor, the basecoat precursor, and the clearcoat precursor are heated i) after each respective application or ii) simultaneously, in order to cure the foundation coat, basecoat, and clearcoat precursors and respectively form a foundation coat, a basecoat, and a clearcoat. The foundation coat is ultraviolet (UV) stable and bonds the metallic substrate to the basecoat and the clearcoat.

17 Claims, 3 Drawing Sheets

COATED ARTICLES AND METHODS OF MAKING THE SAME

CROSS-REFERENCE TO RELATED APPLICATIONS

This application claims the benefit of U.S. Provisional Application Ser. No. 62/167,855, filed May 28, 2015, which is incorporated by reference herein in its entirety.

TECHNICAL FIELD

The present disclosure relates to coated articles, a coating method, and a method for enhancing corrosion resistance of a metallic substrate.

BACKGROUND

Metallic articles/objects (an example of which includes vehicle bodies) can be coated for several reasons. As an example, coating(s) may be applied to provide the metallic article with an aesthetically pleasing appearance. As another example, coating(s) may be applied to provide the metallic article with a protective coating. The protective coating may protect the metallic article from the elements (e.g., rain, snow, ice, etc.), and/or from degradation due to moisture, salt exposure, oxidation, or the like.

SUMMARY

Some of the examples disclosed herein related to a coating method. During an example of the coating method, a metallic substrate is provided. A foundation coat precursor is applied on the metallic substrate. The foundation coat precursor includes a matrix and a plurality of capsules present in the matrix. Each capsule includes a shell and a healing agent surrounded by the shell. A basecoat precursor is applied, and a clearcoat precursor is applied. The metallic substrate, the foundation coat precursor, the basecoat precursor, and the clearcoat precursor are heated i) after each respective application or ii) simultaneously, in order to cure the foundation coat, basecoat, and clearcoat precursors and respectively form a foundation coat, a basecoat, and a clearcoat. The foundation coat is ultraviolet (UV) stable and bonds the metallic substrate to the basecoat and the clearcoat.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A through 2C are schematic, cross-sectional views of a portion of the vehicle body shown FIG. 1, wherein the vehicle body includes a metallic substrate and coatings in accordance with an example of the present disclosure, and wherein FIG. 2A illustrates the portion prior to a disruption of the coatings on a metallic substrate, FIG. 2B illustrates disruption of the coatings and release of a healing agent in one of the coatings, and FIG. 2C illustrates a self-healed portion of the one of the coatings;

DETAILED DESCRIPTION

Figure 1:
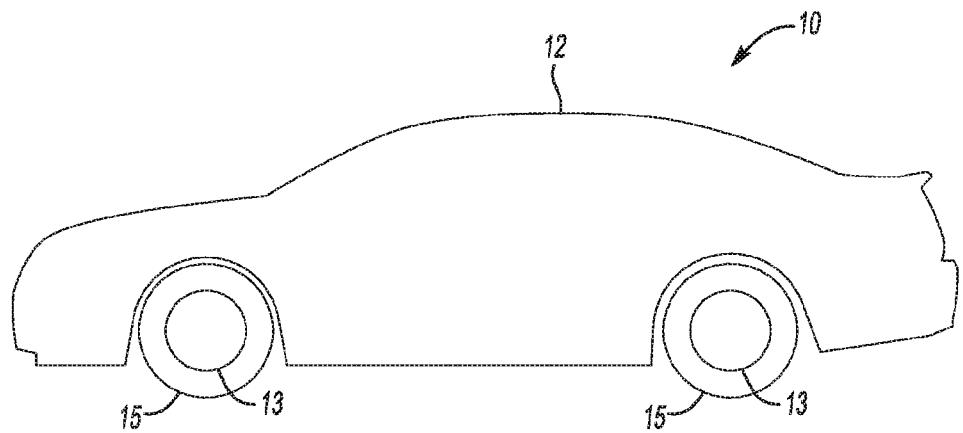
FIG. 1 is a schematic side view of a vehicle including a vehicle body.

Metallic substrates may be used as a base for many objects, including sheet panels, tools, equipment, automotive vehicle bodies, or the like. Metallic substrates may be formed of steel, aluminum, or magnesium. It may be desirable to coat metallic substrates, for aesthetics, protection, etc.

As noted, automotive vehicle bodies may include the metallic substrate. These metallic substrates may be coated with five layers or coats, namely: (a) a phosphate coat; (b) an electro-deposition coat (i.e., e-coat); (c) a primer; (d) a basecoat; and (e) a clearcoat. The phosphate coat promotes adhesion between the paint layers (e.g., e-coat, primer, basecoat, and clearcoat) and the metallic substrate (e.g., steel or aluminum). The e-coat provides corrosion protection. As used herein, the terms "electro-deposition coat" and "e-coat" refer to a coating created using any suitable electro-deposition operation or process (i.e., an anti-corrosion electroplating bath). As used herein, the term "primer" means a coating capable of protecting the metallic substrate and the other coatings (e.g., phosphate coat, e-coat, basecoat, and clearcoat) against ultraviolet (UV) radiation from the sun or other sources. The primer therefore provides the vehicle body with UV radiation resistance. As used herein, the term "basecoat" means a polymeric coating including a color pigment, which imparts a color (e.g., red) to the vehicle body. Also as used herein, the term "clearcoat" refers to a polymeric coating that can provide gloss and/or protection to the vehicle body. As such, the clearcoat may enhance the appearance of the vehicle body and may provide protection against scratches, environmental elements, etc.

In examples of the method disclosed herein, a single coat (referred to herein as a foundation coat) replaces the phosphate coat, the e-coat, and in some instances, the primer. The foundation coat disclosed herein includes core-shell capsules, which have a healing agent as the core. When the foundation coat is damaged (e.g., by external forces, such as stone chipping, etc.), the shell of the capsule is disrupted. Disruption of the shell releases the healing agent. The healing agent may be activated when exposed to air or another healing agent. The activated healing agent(s) polymerizes, cures, or otherwise reseals the damaged foundation coating. The self-healing property of the foundation coating provides enhanced corrosion resistance, in part because the resealed foundation coating keeps the underlying metallic substrate from being exposed to potentially corrosive elements. In addition to enhanced corrosion resistance, the foundation coat disclosed herein provides adhesion promotion and UV radiation resistance.

The examples provided herein relate to a vehicle body as the coated article. In these examples, the metallic substrate is coated with several coatings to form the vehicle body. In addition, it is to be understood that examples of the method(s) of the present disclosure may be suitable for any components and/or subsystems (e.g., brake systems, suspension components, engine components, etc.) that may benefit from corrosion protection. Further, it is to be understood that the method(s) and article(s) disclosed herein are not limited to a vehicle body, components and/or subsystems, but rather the method(s) may be used to coat, and the article(s) may be any metallic object for which it is desirable to provide corrosion protection.

Referring now to FIG. 1, an example of a vehicle 10 is schematically depicted. The vehicle 10 includes a vehicle body 12 and wheels 13 operatively coupled to the vehicle body 12. A tire 15 is operatively coupled to each wheel 13. Although FIG. 1 illustrates a car, it is to be understood that the vehicle 10 may alternatively be a truck, motorcycle, or another kind of vehicle having a vehicle body 12.

Figure 2A:
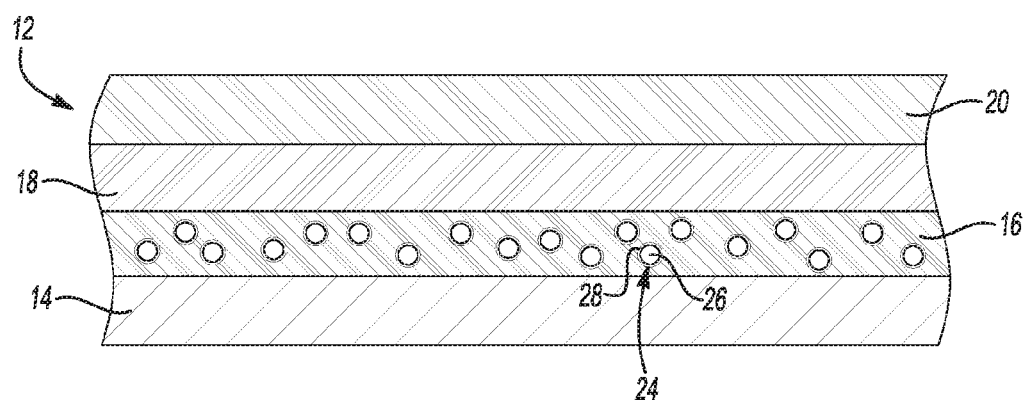
Figure 3:
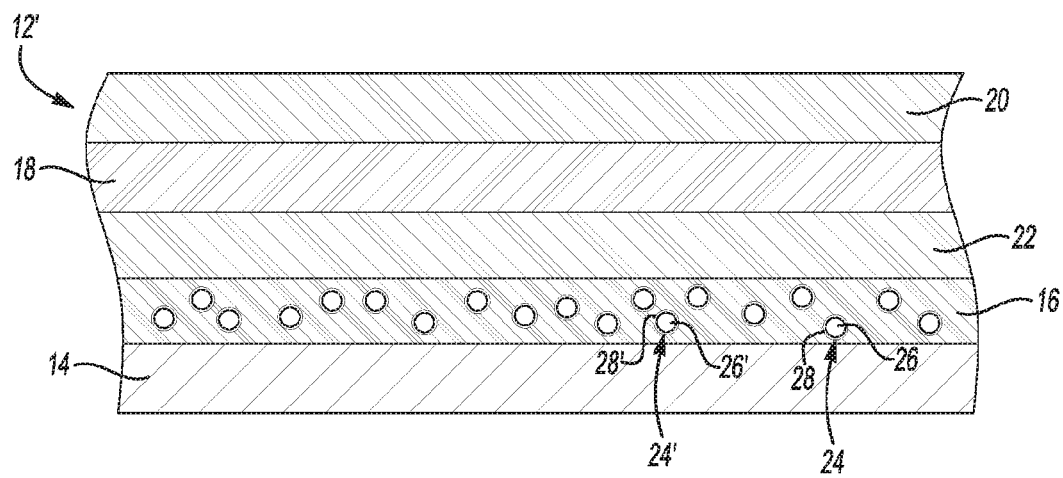
FIG. 3 is a schematic, cross-sectional view of a portion of the vehicle body shown FIG. 1, wherein the vehicle body includes a metallic substrate and coatings in accordance with another example of the present disclosure.

An example of a portion of the vehicle body 12 is shown in cross-section in FIG. 2A. In this example, the vehicle body 12 includes the metallic substrate 14, the foundation coat 16 in direct contact with the metallic substrate 14, a basecoat 18 in direct contact with the foundation coat 16, and a clear coat 20 in direct contact with the basecoat 18. Another example of a portion of the vehicle body 12' is shown in cross-section in FIG. 3. In this example, the vehicle body 12' includes the metallic substrate 14, the foundation coat 16 in direct contact with the metallic substrate 14, a primer 22 in direct contact with the foundation coat 16, the basecoat 18 in direct contact with the primer 22, and the clear coat 20 in direct contact with the basecoat 18. In FIGS. 2A and 3, each of the components 14, 16, 18, 20, 22 is undamaged. Each of the components 14, 16, 18, 20, and 22 will be further described in reference to FIG. 4, which illustrates examples of the methods disclosed herein. It is to be understood that FIGS. 2A and 3 will also be referenced throughout the discussion of FIG. 4.

Figure 4:
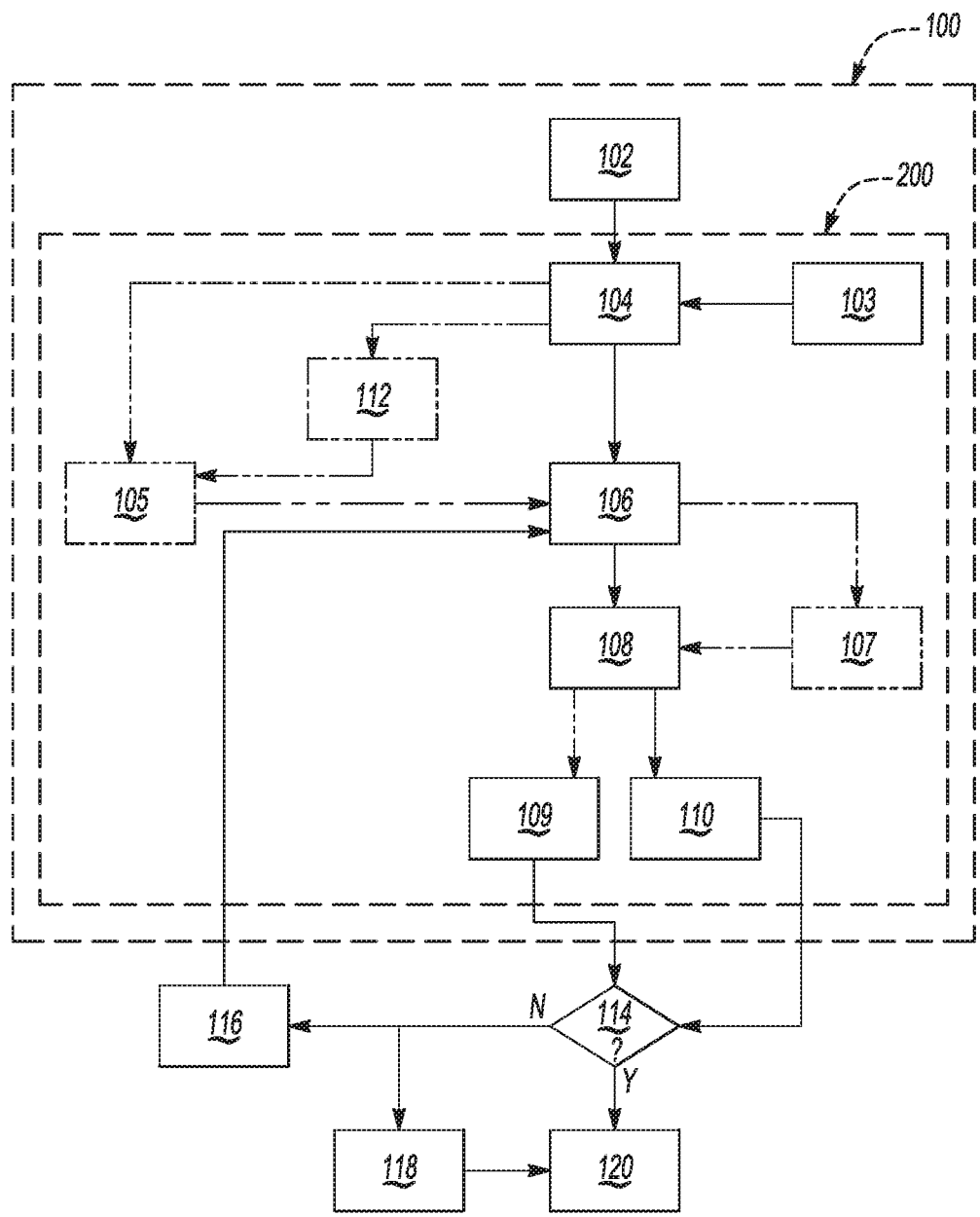
FIG. 4 is a flowchart of examples of the methods disclosed herein.

Referring now to FIG. 4, an example of the method 100 for enhancing corrosion resistance of the metallic substrate 14 is depicted, and an example of the method 200 for coating the vehicle body 12, 12' is depicted. As depicted, the method 100 includes several of the same steps as the method 200, and therefore, the methods 100, 200 will be discussed together.

Generally, the method 100 includes forming a foundation coat precursor (reference numeral 102), applying the foundation coat precursor on the metallic substrate 14 (reference numeral 104), applying the basecoat precursor (reference numeral 106), applying the clearcoat precursor (reference numeral 108), and heating the metallic substrate 14, the foundation coat precursor, the basecoat precursor, and the clearcoat precursor i) after each respective application (reference numerals 105, 107, 109) or ii) simultaneously (reference numeral 110), in order to cure the foundation coat precursor, the basecoat precursor, and the clearcoat precursor and to respectively form the foundation coat 16, the basecoat 18, and the clearcoat 20.

Generally, the method 200 includes providing the metallic substrate 14 (reference numeral 103), applying the foundation coat precursor on the metallic substrate 14 (reference numeral 104), applying the basecoat precursor (reference numeral 106), applying the clearcoat precursor (reference numeral 108), and heating the metallic substrate 14, the foundation coat precursor, the basecoat precursor, and the clearcoat precursor i) after each respective application (reference numerals 105, 107, 109) or ii) simultaneously (reference numeral 110), in order to cure the foundation coat precursor, the basecoat precursor, and the clearcoat precursor and to respectively form the foundation coat 16, the basecoat 18, and the clearcoat 20. The method 200 may also begin with the formation of the foundation coat precursor, as shown at reference numeral 102.

It is to be understood that, in other examples of the methods 100, 200 disclosed herein, the curing of the foundation coat precursor, the basecoat precursor, and the clearcoat precursor to respectively form the foundation coat 16, the basecoat 18, and the clearcoat 20 may be accomplished by methods other than heating. In an example, the foundation coat precursor, the basecoat precursor, and the clearcoat precursor may be formulated to be cured by air drying at room temperature (from about 20° C. to about 25° C.) without heating (e.g., if longer curing times are acceptable).

The formation of the foundation coat precursor will now be described. The foundation coat precursor is a precursor to the foundation coat 16. In the examples disclosed herein, the foundation coat 16 may be a sol-gel coating, or a coating formed by a sol-gel process. During the sol-gel process, nanoparticles suspended in a liquid solution (i.e., a sol) are invoked to interconnect/agglomerate and form a continuous, porous, nanostructured network of particles across the volume of the liquid medium (i.e., a gel). Drying the gel drives off the liquid and causes the nanostructured network of particles to cross-link and cure, thereby forming the foundation coat 16.

In the examples disclosed herein, the foundation coat precursor includes a matrix and a plurality of capsules incorporated into the matrix. The matrix of the foundation coat precursor may be in the form of the sol (i.e., nanoparticles suspended in a liquid solution).

The sol matrix of the foundation coat precursor includes nanoparticles suspended in a liquid. An example of the sol matrix includes titania nanoparticles suspended in a liquid (e.g., water, ethanol, butyl acetate, etc.). Another example of the sol matrix includes silica nanoparticles suspended in a liquid (e.g., water, ethanol, butyl acetate, etc.). In this example, the composition of the silica nanoparticles can be expressed by the empirical formula $SiO_2$, or the polymer formula $(SiO_4)_n$ (where each silicon atom is attached by a single bond to four oxygen atoms, which bridge to other silicon atoms). It is to be understood that not every silicon atom of every silica nanoparticle may form four siloxane bridges (—Si—O—Si—) and instead includes one or more of its hydroxyl (—OH) or alkoxy (—OR) groups. These groups are terminal groups that cover the surface of the silica nanoparticles, and enable the silica nanoparticles to interconnect to form the gel.

The sol matrix may be formed from a nanoparticle source material, a reactant, and a liquid that does not participate in the reaction between the nanoparticle source material and the reactant. A catalyst may also be included that speeds up the chemical reaction(s) taking place in to form the sol.

The nanoparticle source material may be a silica nanoparticle source material, such as a silicon alkoxide (e.g., tetramethoxysilane or tetraethoxysilane) or a sodium silicate (e.g., $Na_2SiO_3$ or sodium metasilicate, sodium polysilicate or $(Na_2SiO_3)_n$, sodium orthosilicate or $Na_4SiO_4$, and the like). The nanoparticle source material may be a titania nanoparticle source material.

When the nanoparticle source material is a silicon alkoxide, the liquid may be a solvent or solvent mixture (e.g., ethanol, acetone, butyl acetate, or combinations thereof), and the reactant may be water or an alcohol. Examples of a suitable catalyst include ammonium hydroxide or ammonium fluoride. In this example, several reactions take place to form the silica nanoparticles, and the sol. One of the reactions is hydrolysis, in which the silicon alkoxide reacts with the water to form silanol (Si—OH) groups. These silanol groups can then react either with each other or with another alkoxide group (Si—OR) to form a siloxane bridge (Si—O—Si), which joins two molecules into one larger molecule. As mentioned above, each silicon atom can form up to four siloxane bridges. This enables the initially small molecules to connect together to form larger molecules (i.e., the silica nanoparticles) which contain, for example, thousands of silicon-oxygen bridges.

When the nanoparticle precursor is a sodium silicate, the liquid may be water, and the reactant may be an acid (e.g., hydrochloric acid or sulfuric acid). In this example, when the acid is added, hydrolysis will occur and the silanol groups will form. The silicate molecules form siloxane bonds with other silicate molecules and bridge together to form the silica nanoparticles in the liquid, resulting in another example of the sol matrix.

At some point, the nanoparticles in the sol matrix reach a critical point where they stop growing in size and instead agglomerate with other nanoparticles. This may be dependent on several factors, including the pH and concentration of other species in the sol matrix. The terminal hydroxyl and alkoxy groups on the surface of the nanoparticles allow the nanoparticles to interconnect with each other. When the nanoparticles join together to form a continuous network spans the liquid solution, the gel has formed.

In the examples disclosed herein, the matrix of the foundation coat precursor is the sol. Depending on the chemistry of the sol reaction solution, gelation may naturally occur following sol formation. As an example, the substrate may be dipped in to the sol matrix having nanoparticles therein (i.e., the foundation coat precursor), and the gel forms as the substrate is removed from the sol matrix or after it is removed from the matrix. The gel may then be air or bake cured to form the foundation coat. In other instances, the onset of gelation may require an additional catalyst, water, oxygen, a temperature changes, or more time.

An example of forming a sol-gel coating follows.

A typical precursor uses metal alkoxides such as, e.g., silicone tetraethoxide [$Si(OC_2H_5)_4$, TEOS] in an ethanol solvent. Then the sol-gel coating forms in four stages:
1) The precursor reacts with water such as humidity in the air in a hydrolysis reaction:
   a. $Si(OC_2H_5)_4 + H_2O \rightarrow HO—Si(OC_2H_5)_3 + C_2H_5OH$; or
   b. $Si(OC_2H_5)_4 + 4H_2O \rightarrow Si(OH)_4 + 4C_2H_5OH$
2) Condensation and polymerization of monomers forms chains and particles:
   a. $(OC_2H_5)_3Si—OH + HO—Si(OC_2H_5)_3 \rightarrow (OC_2H_5)_3Si—O—Si(OC_2H_5)_3 + H_2O$; or
   b. $(OC_2H_5)_3Si—OC_2H_5 + HO—Si(OC_2H_5)_3 \rightarrow (OC_2H_5)_3Si—O—Si(OC_2H_5)_3 + C_2H_5OH$
   Sol: nano-sized silica particles are synthesized from repeated hydrolysis and condensation of silicon alkoxides.
3) The polymers continue to crosslink and grow into networks throughout the liquid medium and form a gel. Gelation: silica particles continue to grow and crosslink to form chains and a networked structure, forming a gel.
4) The solvent evaporates either by heat or at room temperature and forms a dense ceramic film on the substrate.

The sol matrix of the foundation coat precursor may also be purchased. As an example, the matrix of the foundation coat precursor may be one of the coatings sold by COVAL MOLECULAR COATINGS such as the coating sold under the trade name COVAL METAL COAT™.

The foundation coat precursor also includes the previously mentioned capsules in the sol matrix. The capsules may be mixed into the sol matrix as an additive. The capsules may be added, by weight percent with respect to the weight of the sol matrix, in an amount ranging from about 1 wt % to about 40 wt %. It is to be understood that this percentage may be varied depending upon a desired level of self-healing. As another example, the capsules may be added in an amount ranging from about 5 wt % to about 10 wt % of the total sol matrix wt %. The capsules 24 are shown in FIGS. 2A and 3 in the foundation coat 16.

The capsules 24 include a shell 28 that surrounds a core 26. It is to be understood that the shell 28 may have any suitable thickness. In an example, the thickness of the shell 28 ranges from about $1/20^{th}$ to about $1/5^{th}$ of the diameter of the capsule 24. The shell 28 may be formed of any material that is chemically compatible with the nanoparticles in the sol, the gel, and ultimately the foundation coat 16. By "chemically compatible," it is meant that the shell 28 is capable of covalently bonding (e.g., cross-linking) to the foundation coat 16. For example, on shell material X, covalent bonds Si—O—X can be formed between shell material X and a silicone-based sol-gel coating.

In an example, each of the nanoparticles and the shell 28 are formed of silica (silicon dioxide) or titania. When the nanoparticles are bonded/cross-linked together during curing, the capsules 24 can also participate in cross-linking through the shell 28. Other examples of the shell 28 may include quartz crystal or silica glass.

Figure 2B:
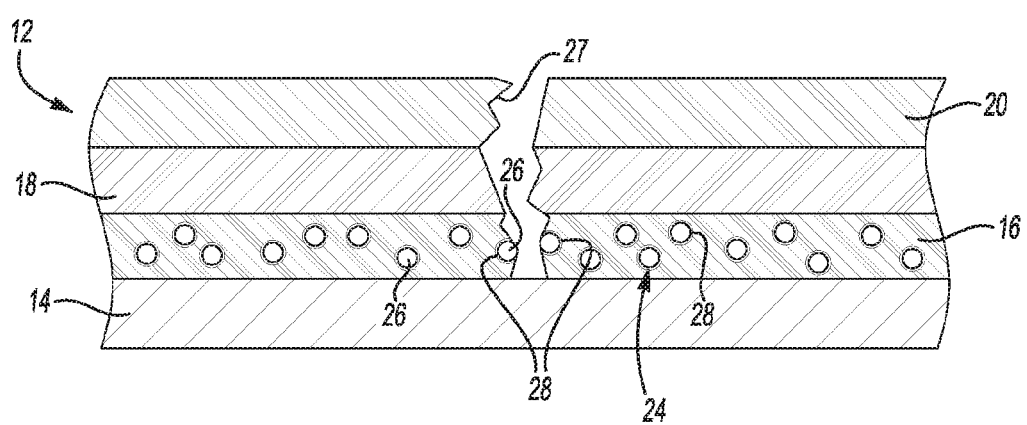

The shell 28 is capable of being disrupted (i.e., broken, cracked, etc.), for example, when the vehicle body 12 is scratched, and the disruption in the shell 28 releases the material making up the core 26. The disruption of the shell 28 and the release of the core 26 material is shown in FIG. 2B, and the scratch is labeled 27.

Figure 2C:
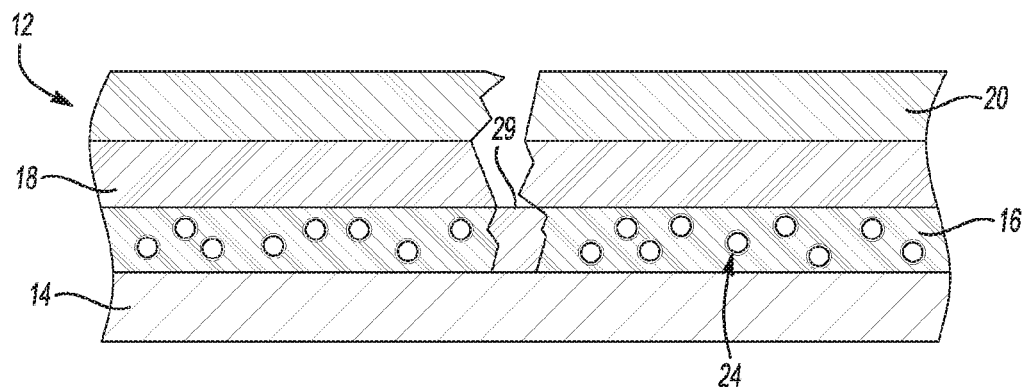

The core 26 of the capsules 24 includes the healing agent. The healing agent is compatible with the dried and cured foundation coat 16. By "compatible," it is meant that the healing agent is capable of adhering to the foundation coat 16. As an example, a suitable healing agent may have similar sol-gel coating chemistry as the matrix used to form the foundation coat 16, and may also have air or oxygen activated curing. This type of healing agent, when released from the shell 28 may be exposed to air, activated, and polymerized or cross-linked to reseal the damaged area of the foundation coat 16. The resealed portion 29 of the foundation coat 16 is shown in FIG. 2C.

Examples of the self-healing agent include silicon based polymers, polyurethane polymers, or higher concentration alcohol-based sol-gel materials with nanoparticles therein ("higher" being, e.g., 40 wt % $SiO_2$ concentration as opposed to a, e.g., 25 wt % normal $SiO_2$ solid content) (where the nanoparticle concentration is higher than the nanoparticle concentration in the sol matrix of the foundation coat precursor).

In an example of the one-part system, the healing agent within the cores 26 of the capsules 24 may include an unsaturated multi-functional resin capable of oxygen initiated cross-linking. The unsaturated multifunctional resin may be an alkyd resin. In an example, the alkyd resin is formed from a fatty acid, a tri-functional alcohol, and an acid or acid anhydride. In another example, the alkyd resin includes a telechelic end group selected from the group consisting of an epoxy, an isocyanate, a polyol, a silanol, a vinyl terminated silane, a vinyl group, an unsaturated fatty acid, and an unsaturated functional group. Examples of a one-part system are commercially available from Autonomic Materials Inc., Champaign, Ill.

Other examples of the self-healing agent are two-part systems. An example of the two-part system is shown in FIG. 3. In these systems, the foundation coat precursor and the formed foundation coat 16 include therein a blend of first and second capsules 24, 24'. These capsules 24, 24' may have the same type of shell 28, but the cores 26, 26' may be formed of two different healing agents. For example, the first capsules 24 in a two-part system may include a curable resin as the core 26, and the second capsules 24' in a two-part system may include a curing agent of the curable resin as the core 26'. When the shells 28 of these capsules 24, 24' are disrupted and the cores 26, 26' come in contact with one another, the curing agent core 26' initiates the curing of the curable resin core 26.

In an example of the two-part system, the healing agent within the cores 26 of the capsules 24 may include an unsaturated multi-functional resin capable of oxygen initiated cross-linking. The unsaturated multifunctional resin may be an alkyd resin. In an example, the alkyd resin is formed from a fatty acid, a tri-functional alcohol, and an acid or acid anhydride. In another example, the alkyd resin includes a telechelic end group selected from the group consisting of an epoxy, an isocyanate, a polyol, a silanol, a vinyl terminated silane, a vinyl group, an unsaturated fatty acid, and an unsaturated functional group. The cores 26' of capsules 24' may include a catalyst or a curing agent. In an example, the catalyst is a metallic complex, the metal of the metallic complex being selected from the group consisting of cobalt, manganese, iron, cerium, vanadium, zirconium, bismuth, barium, aluminum, calcium, zinc, lithium, and potassium. An example of a curing agent is an epoxy curing agent.

In another example, the curable resin core 26 may be a vinyl-terminated polydimethylsiloxane resin and the curing agent core 26' may be any suitable curing agent for the vinyl-terminated polydimethylsiloxane (PDMS) resin. This particular two-part system is commercially available in the AMI Series 1 from Autonomic Materials Inc., Champaign, Ill.

In yet another example of a two-part system, capsules 24 may include as the core 26 a resin with reactive chemical groups (e.g., hydroxyls or amines); and capsules 24' may include as the core 26' a polyisocyanate resin capable of reacting with the core 26 resin. When the two capsules 24, 24' rupture and the two cores 26, 26' mix together, a cross-linking reaction occurs, and a new polyurethane protective coating forms.

The capsules 24, 24' may be embedded and dispersed in the matrix using any suitable dispersion technique. In an example, embedding and dispersing occur simultaneously. In an example, embedding and dispersing are accomplished using mechanical agitation after directly mixing the capsules 24, 24' into the sol matrix of the foundation coat precursor. It is to be understood that the agitation speed, material viscosity, and agitation time may affect whether the shell 28 is ruptured during embedding and dispersing. Lower agitation speed, lower viscosity, and shorter agitation time results in a lower number of shells being ruptured during embedding and dispersing, however, these same parameters can also lead to the capsules 24, 24' being less uniformly dispersed throughout the matrix.

The capsules 24, 24' may be micro-sized or nano-sized. In one example, the capsules 24, 24' are similarly sized to the nanoparticles in the sol matrix. In another example, the capsules 24, 24' may contain silica nanoparticles as the healing agent, and these capsules 24, 24' may be micro-sized.

As shown at reference numeral 103 in FIG. 4, the methods 100, 200 may include providing the metallic substrate 14. Examples of the metallic substrate 14 include steel, magnesium, or aluminum. In an example, the metallic substrate 14 may be a vehicle body-in-white (BIW). As used herein, the term "vehicle BIW" refers to the sheet metal components of the vehicle body that are welded together, including swing metals (e.g., doors, hood, and decklid), but without moving parts (e.g., wheels and tires), the motor, chassis sub-assemblies, or trim (e.g., glass, seats, upholstery, electronics, etc.), and before painting. The metallic substrate 14 (e.g., vehicle BIW) may be supplied using a conveyer. At this point, all the sealers and adhesives in the vehicle BIW are fully cured or gelled.

Providing the metallic substrate 14 may also involve cleaning the metallic substrate 14 (e.g., vehicle BIW). For example, the vehicle BIW may undergo a multi-stage cleaning process in order to remove contamination from the entire vehicle BIW. Water and cleaner may be sprayed on the vehicle BIW to clean it. After the metallic substrate 14 has been cleaned, the method 100, 200 continues to reference numeral 104.

At reference numeral 104 in FIG. 4, the foundation coat precursor is applied directly on the metallic substrate 14. In an example, the foundation coat precursor is supplied in a tank or other suitable container, and the metallic substrate 14 is dipped into the tank. Dip coating applies the foundation coat precursor over the exposed surfaces of the metallic substrate 14, including all of the interior and exterior surfaces of the metallic substrate 14 (e.g., vehicle BIW). At this stage, the foundation coat precursor is not cured.

Some examples of the methods 100, 200 involve the application of three precursors (including the foundation coat precursor) and one bake. As used herein, the term "bake" means a process in which at least one polymer coat is heated in an oven to cure that polymeric coat. The methods 100, 200 involving the application of three precursors and one bake will now be described in reference to FIGS. 104, 106, 108, and 110. In these examples, the methods 100, 200 proceed from the application of the foundation coat precursor (reference numeral 104) to the application of the application of a basecoat precursor (reference numeral 106).

In one example, the basecoat precursor may include a monomer or polymer precursor that polymerizes and cross-links to form the basecoat 18 of the vehicle body 12, 12' when exposed to the heating. In another example, the basecoat precursor may include a polymer that crosslinks to form the basecoat 18 of the vehicle body 12, 12' when exposed to the heating. As examples, the basecoat 18 may include acrylics, vinyls, polyurethanes, polycarbonates, polyesters, alkyds, polyepoxy, polysiloxanes, resins, and combinations thereof. As such, the basecoat precursor may include any monomer, polymer precursor, or polymer that, after curing, will form the basecoat 18. The basecoat precursor also includes a pigment that imparts color (e.g., red, black, etc.) to the basecoat 18 and to the vehicle body 12, 12'.

In this example of the methods 100, 200, the basecoat precursor is directly applied over the foundation coat precursor before the foundation coat precursor is cured. The metallic substrate 14 (e.g., vehicle BIW) with the foundation coat precursor thereon is moved into a basecoat spraying booth. While in the basecoat spraying booth, the basecoat precursor is sprayed over the foundation coat precursor that is already on the metallic substrate 14. At this stage, the basecoat precursor is not cured.

In this example of the methods 100, 200, the metallic substrate 14 coated with the foundation coat precursor and the basecoat precursor may be exposed to a heated flash oven before the clearcoat precursor is applied in order to drive off solvent contained in the basecoat. This may prepare the basecoat for clearcoat precursor application.

In the methods 100, 200 involving the application of the three precursors and one bake, the methods 100, 200 then proceed from the application of the basecoat precursor (reference numeral 106) to the application of a clearcoat precursor (reference numeral 108).

The clearcoat precursor forms the clearcoat 20, which is a polymeric coating that can provide gloss and protection to the vehicle body 12, 12'. An example of the clearcoat 20 is an acrylic based polymer. Examples of the clearcoat precursor may include a hydroxyl acrylic, a polyester carbamate acrylic, polyester, an epoxy, a blocked isocyanate system, or combinations thereof.

In this example of methods 100, 200, the clearcoat precursor is directly applied over the basecoat precursor before the foundation coat precursor and the basecoat precursor are cured. At reference numeral 108, the metallic substrate 14 (e.g., vehicle BIW) with the foundation coat precursor and the basecoat precursor applied thereon can be advanced to a clearcoat spraying booth. While in the clearcoat spraying booth, the clearcoat 20 is sprayed on the basecoat precursor that is already disposed over the foundation coat precursor and metallic substrate 14. At this stage, the clearcoat precursor is not cured.

In this example of the methods 100, 200, after applying the clearcoat precursor over the basecoat precursor, the methods 100, 200 proceed to the one bake (reference numeral 110). The one bake entails heating the metallic substrate 14 (e.g., vehicle BIW), foundation coat precursor, basecoat precursor, and clearcoat precursor simultaneously in order to cure all the precursors to form coats (i.e., foundation coat 16, basecoat 18, and clearcoat 20). Heating may be accomplished so that the metallic substrate 14 is heated in an oven at a temperature ranging from about 220 degrees Fahrenheit to about 320 degrees Fahrenheit for a time ranging from about 15 minutes to about 50 minutes. In an example, the metallic substrate 14 is heated in an oven at a temperature of about 280 degrees Fahrenheit for 30 minutes. In this example, the metallic substrate 14, foundation coat precursor, basecoat precursor, and clearcoat precursor may be baked in an oven in order to cure the precursors and form the respective coats in one bake. As discussed above, the term "bake" means a process in which a precursor is heated in an oven to cure and form a polymeric coat. After heating, the vehicle body 12, 12' is formed and then removed from the oven.

Other examples of the methods 100, 200 involve a bake after the application of each of the three precursors. These examples methods 100, 200 involve respective bakes at each of reference numerals 105, 107 and 109. The methods 100, 200 involving individual bake steps will now be described.

In these examples, the methods 100, 200 proceed from the application of the foundation coat precursor (reference numeral 104) to the first bake (reference numeral 105). At reference numeral 105 in FIG. 4, after the foundation coat precursor is applied to the metallic substrate 14, the coated substrate is exposed to heating (e.g., in an oven at a temperature of about 250 degrees Fahrenheit for about 20 minutes). The bake at reference numeral 105 cures the foundation coat precursor to form the foundation coat 16.

This example of the method proceeds to reference numeral 106, where the basecoat precursor is applied to the cured foundation coat 16. The basecoat precursor may be applied in a similar manner as previously described, except that the underlying foundation coat 16 is cured.

In these examples, the methods 100, 200 proceed from the application of the basecoat precursor (reference numeral 106) to a heated flash bake (e.g., the second bake shown at reference numeral 107). At reference numeral 107 in FIG. 4, after the basecoat precursor is applied to the cured foundation coat 16, the coated substrate is exposed to heating. In this bake, the goal is not to cure the basecoat precursor to form the basecoat 18, but rather is to dry the basecoat precursor to prepare the basecoat precursor for the application of the clearcoat precursor. The heated flash bake may be accomplished in an oven at 180 degrees Fahrenheit for about 10 minutes.

This example of the method proceeds to reference numeral 108, where the clearcoat precursor is applied to the dried basecoat precursor. The clearcoat precursor may be applied in a similar manner as previously described, except that the underlying foundation coat 16 is cured and the underlying basecoat precursor is dried.

In these examples, the methods 100, 200 proceed from the application of the clearcoat precursor (reference numeral 108) to the third bake (reference numeral 109). At reference numeral 109 in FIG. 4, after the clearcoat precursor is applied to the dried basecoat precursor, the coated substrate is exposed to heating. The third bake may be accomplished in an oven at 280 degrees Fahrenheit for about 30 minutes. The bake at reference numeral 109 cures the dried basecoat precursor to form the basecoat 18 and the clearcoat precursor to form the clearcoat 20.

Again referring back to reference numeral 104 where the foundation precursor is applied to the metallic substrate 14, still other examples of the methods 100, 200 may proceed to reference numeral 112, where a primer precursor is applied to the uncured foundation coat precursor. At reference numeral 112, the metallic substrate 14 (e.g., vehicle BIW) having the foundation coat precursor thereon is positioned in a primer spraying booth. While in the primer spraying booth, the primer precursor is sprayed directly over the foundation coat precursor that is already disposed on the metallic substrate 14.

After the primer precursor application, the methods 100, 200 then proceed to the bake at reference numeral 105. In this example, the bake at reference numeral 105 entails heating the metallic substrate 14, the foundation coat precursor, and the primer precursor in order to cure the foundation coat precursor and the primer precursor to form, respectively, the foundation coat 16 and the primer 22. To perform the bake, the metallic substrate 14 coated with the foundation coat precursor and the primer precursor may be placed in an oven and heated to a suitable curing temperature. After being cured, the primer precursor forms the primer 22 (FIG. 3). The primer 22 is a coating that is capable of protecting the metallic substrate 14 and the other coats (i.e., foundation coat 16, basecoat 18, and clearcoat 20) against UV radiation exposure.

After curing at reference numeral 105, the foundation coat 16 and the primer 22 are formed, and the methods 100, 200 may proceed to reference numeral 106, where the basecoat precursor is applied in a similar manner as previously described. As one example, the methods 100, 200 may continue then with reference numerals 108 (clearcoat precursor application) and 110 (heating to form basecoat 18 and clearcoat 20). As another example, the methods 100, 200 may continue with reference numerals 107 (heating to form basecoat 18), 108 (clearcoat precursor application), and 109 (heating to form clearcoat 20).

After the precursors are cured and the coats 16, 18, 20 (and in some instances 22) are formed, the methods 100, 200 may further include additional processes. At reference numeral 114, the vehicle body 12, 12' may be inspected to identify defects. For example, the vehicle body 12, 12' may be subjected to a quality inspection. If the vehicle body 12, 12' passes the quality inspection, the vehicle body 12, 12' is sent to a general assembly area at reference numeral 120. At the general assembly area, the vehicle body 12, 12' is coupled to the other components of the vehicle 10. Conversely, if the vehicle body 12, 12' fails the quality inspection because, for example, some defects are identified, the methods 100, 200 may proceed to reference numeral 116 or 118.

At reference numeral 116, the identified defects are repaired. These repairs may be conducted in-line by re-routing the vehicle body 12, 12' back to the basecoat spraying booth at reference numeral 106. Alternatively, at reference numeral 118, the repairs may be conducted offline after the quality inspection at 114, and the vehicle body 12, 12' is sent to the general assembly area after the defects have been repaired.

It is to be understood that throughout the methods 100, 200 the metallic substrate 14 does not undergo an electro-deposition (ELPO) operation or process (i.e., an anti-corrosion electroplating bath) in order to create an ELPO coat or layer, which may be made of an epoxy based material. In other words, the metallic substrate 14 (or any other part of the vehicle body 12, 12') is not subjected to an ELPO operation. The ELPO coat may be referred to as an electro-deposition coat, an electrophoretic deposition (EPD) coat, or an e-coat. Accordingly, the vehicle body 12, 12' does not include an electro-deposition coat.

The examples of the vehicle body 12 (FIG. 2A) and 12' (FIG. 3) include several coats, including the foundation coat 16, the basecoat 18, the clearcoat 20, and in some instances the primer 22.

An example of foundation coat 16 covalently bonding to metallic substrate 14 is shown below.

$$Si(OR)_4$$

$$+$$

$$H_2O$$

$$\downarrow$$

$$HO-Si(OR)_3$$

$$+$$

$$ROH$$

Hydrolysis reaction - silicone alkoxide precursor reacts with water;

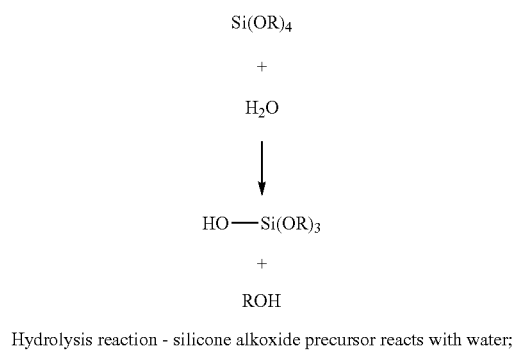

Cross-linking and gel forming in the precursor;

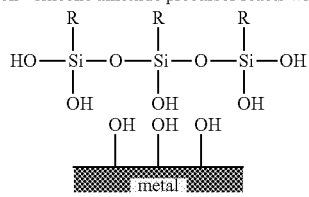

Monomers attracted to the metal surface by hydrogen bonds; and ROH and/or $H_2O$ $$+$$

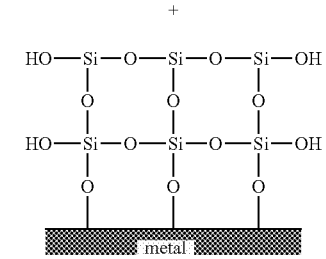

Condensation and continued cross-linking form a covalently bonded coating film on the surface.

This foundation coat 16 is a polymeric coating that is inherently UV stable and is capable of protecting the vehicle body 12, 12' against corrosion through self-healing, and helps bond the metallic substrate 14 to other coatings. The term "inherently UV stable" means that the material forming the foundation coat 16, by itself and without any UV stable additives, does not crack or disintegrate when attacked by ultraviolet radiation. As an example, the foundation coat 16 can be rated UV-8. A material or coat rated UV-8 can withstand 8000 hours of exposure to UV light before the elongation at break is reduced to 50% of the original value during testing in a Weather-OMeter. UV ratings (e.g., UV-X) are expressed as a multiple of 1000 hours of exposure until a chosen mechanical property (e.g., elongation at break or tensile strength) reaches 50% of the original value (i.e., the value of the mechanical property before the material was subjected to UV light). As examples, the UV rate of the foundation coat 16 may range between UV-5 and UV-10.

With its self-healing property, the foundation coat 16 is able to repair cracks, scratches, or other disruptions in the foundation coat 16. The repaired portions keep the underlying metallic substrate 14 from being exposed to external elements, and thus enhance the corrosion resistance of the vehicle body 12, 12'. In addition to the self-healing enhancing corrosion resistance, the coat 16 itself protects the vehicle body 12, 12' against corrosion such that the corrosion rate (as expressed in mils penetration per year (mpy)) ranges between the 0.9 and 10 mpy. For example, the corrosion rate (as expressed in mpy) may be 3 mpy.

The capsules 24, 24' in the foundation coat 16 may lead to the coat 16 having increased surface roughness. To reduce the surface roughness, the capsules 24, 24' may be nano-sized. In an example, it may be desirable that the nanoparticles in the matrix and the capsules 24, 24' be approximately the same size (e.g., having an average diameter from about 700 nm to about 900 nm). Similarly sized particles lead to the foundation coat 16 exhibiting surface smoothness.

In other examples, the capsules 24, 24' may have a size/average diameter ranging from about 1 micron to about 25 microns.

The foundation coat 16 is chemically bonded to the metallic substrate 14. The term "chemically bonded" means that a chemical covalent or ionic bond couples the foundation coat 16 with the metallic substrate 14. The foundation coat 16 is therefore configured to establish a strong adhesion bond with the metallic substrate 14. As an example, the bond energy of the chemical bond between the foundation coat 16 and the metallic substrate 14 may range between 600 kilojoule per mol (kJ/mol) and 800 kJ/mol. As an example, the bond energy of the chemical bond between the foundation coat 16 and the metallic substrate 14 may be 700 kJ/mol.

When included, the primer 22 provides additional UV radiation resistance.

The basecoat 18 is a polymeric coating that is applied over the foundation coat 16 or the primer 22. The basecoat 18 imparts color to the vehicle body 12, 12'.

The clearcoat 20 is applied over the basecoat 18. The clearcoat 20 is a polymeric coating that can provide gloss and protection to the vehicle body 12, 12'.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 600 kilojoule per mol (kJ/mol) and 800 kJ/mol should be interpreted to include not only the explicitly recited limits of from about 600 kJ/mol to about 800 kJ/mol, but also to include individual values, such as 650.5 kJ/mol, 700 kJ/mol, 795 kJ/mol, etc., and sub-ranges, such as from about 650 kJ/mol to about 750 kJ/mol; from about 625 kJ/mol to about 775 kJ/mol, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A coating method, comprising:
   applying a foundation coat precursor on a metallic substrate, the foundation coat precursor including:
      a sol matrix comprising titania or silica nanoparticles suspended in a liquid comprising water, ethanol, or butyl acetate; and
      a plurality of capsules present in the sol matrix, each capsule including a shell capable of covalently bonding to the sol matrix and a healing agent surrounded by the shell, wherein the healing agent is an alcohol-based sol-gel material comprising titania or silica nanoparticles and is compatible with the sol matrix;
   applying a basecoat precursor on the foundation coat precursor;
   applying a clearcoat precursor on the basecoat precursor; and
   heating the metallic substrate, the foundation coat precursor, the basecoat precursor, and the clearcoat precursor i) after each respective application or ii) simultaneously, in order to cure the foundation coat, basecoat, and clearcoat precursors and respectively form a foundation coat, a basecoat, and a clearcoat;
   wherein the foundation coat is ultraviolet (UV) stable and bonds the metallic substrate to the basecoat and the clearcoat.

2. The method as defined in claim 1 wherein the metallic substrate is not subjected to an electro-deposition (ELPO) operation.

3. The method as defined in claim 1 wherein:
   the applying of the foundation coat precursor includes dipping the metallic substrate in a tank containing the foundation coat precursor;
   the applying of the basecoat includes spraying the basecoat over the foundation coat precursor after the foundation coat precursor has been applied on the metallic substrate; and
   the applying of the clearcoat precursor includes spraying the clearcoat precursor over the basecoat precursor after the basecoat precursor has been applied over the foundation coat precursor.

4. The method as defined in claim 1 wherein the heating of the metallic substrate includes positioning the metallic substrate in an oven after applying the foundation coat precursor, the basecoat precursor, and the clearcoat precursor, and heating the metallic substrate using the oven at a temperature between about 220 degrees Fahrenheit and about 320 degrees Fahrenheit for a time between 15 minutes and 50 minutes.

5. A coated article, comprising:
   a metallic substrate;
   a foundation coat bonded to the metallic substrate, the foundation coat including:
      cross-linked silica nanoparticles; and
      a plurality of capsules disposed among the cross-linked silica particles, each capsule including a shell capable of covalently bonding to the cross-linked silica nanoparticles and a healing agent surrounded by the shell, wherein the healing agent is an alcohol-based sol-gel material comprising silica nanoparticles, and wherein the shell and the healing agent are chemically compatible with the cross-linked silica nanoparticles;
   a basecoat disposed over the foundation coat, wherein the foundation coat is disposed between the metallic substrate and the basecoat; and
   a clearcoat disposed over the basecoat, wherein the basecoat is disposed between the clearcoat and the foundation coat.

6. The coated article as defined in claim 5 wherein the coated article does not include an electro-deposition coat.

7. The coated article as defined in claim 5 wherein the plurality of capsules is a plurality of first capsules and the coated article further comprises a plurality of second capsules, wherein the first capsules include a resin as a first healing agent, and where the second capsules include a curing agent of the resin as a second healing agent.

8. The coated article as defined in claim 5 wherein the shell is selected from the group consisting of titania, silicon dioxide, quartz crystal, and silica glass.

9. The coated article as defined in claim 5 wherein the metallic substrate is formed of steel, aluminum, or magnesium.

10. A method for enhancing corrosion resistance of a metallic substrate, the method comprising:
   incorporating a plurality of capsules in a sol matrix of a foundation coat precursor, each capsule including a shell capable of covalently bonding to the sol matrix and a healing agent surrounded by the shell, wherein the healing agent is an alcohol-based sol-gel material comprising silica nanoparticles suspended in a liquid that is compatible with the sol matrix, and wherein the sol matrix comprises silica nanoparticles suspended in a liquid comprising water, ethanol, or butyl acetate;

dipping the metallic substrate in a tank containing the foundation coat precursor in order to apply the foundation coat precursor over the metallic substrate;

applying a basecoat precursor over the foundation coat precursor;

applying a clearcoat precursor over the basecoat precursor; and heating the metallic substrate, the foundation coat precursor, the basecoat precursor, and the clearcoat precursor i) after each respective application or ii) simultaneously, in order to cure the foundation coat precursor, the basecoat precursor, and the clearcoat precursor and to respectively form a foundation coat, a basecoat, and a clearcoat;

wherein the healing agent, when released from the shell, polymerizes with the sol matrix, resealing the foundation coat.

11. The method as defined in claim 10 wherein the incorporating of the plurality of capsules in the sol matrix includes adding the capsules to the sol matrix in an amount ranging from about 1 wt % to about 40 wt % of a total wt % of the sol matrix.

12. The method as defined in claim 1 wherein the sol matrix has a nanoparticle concentration of 25 wt % and the plurality of capsules has a nanoparticle concentration of 40 wt %.

13. The method as defined in claim 1 wherein the shell is selected from the group consisting of titania, silicon dioxide, quartz crystal, and silica glass.

14. The method as defined in claim 1 wherein the clearcoat precursor is selected from the group consisting of a hydroxyl acrylic, a polyester carbamate acrylic, a polyester, an epoxy, a blocked isocyanate system, and combinations thereof; and wherein the metallic substrate is formed of at least one of steel, aluminum, or magnesium.

15. The coated article as defined in claim 7 wherein the resin of the first capsules is a vinyl-terminated polydimethylsiloxane (PDMS) resin and the curing agent of the second capsules is a polyisocyanate resin.

16. The method as defined in claim 1 wherein a silica nanoparticle source material is one of a silicon alkoxide or a sodium silicate, wherein the silicon alkoxide is selected from the group consisting of tetramethoxysilane and tetraethoxysilane and the sodium silicate is selected from the group consisting of sodium metasilicate, sodium polysilicate, and sodium orthosilicate.

17. The coated article as defined in claim 5 wherein the basecoat includes a pigment and one or more compounds selected from the group consisting of acrylics, vinyls, polyurethanes, polycarbonates, polyesters, alkyds, polyepoxy, polysiloxanes, resins, and combinations thereof.

* * * * *